United States Patent [19]
Corrigan et al.

[11] Patent Number: 5,127,131
[45] Date of Patent: Jul. 7, 1992

[54] REMOVABLE HAND HOLD

[75] Inventors: Robert D. Corrigan, Fairview Park; Robert L. Hauer, Rocky River, both of Ohio

[73] Assignee: The United States of America as represented by the Administrator of the National Aeronautics and Space Administration, Washington, D.C.

[21] Appl. No.: 687,606

[22] Filed: Apr. 15, 1991

[51] Int. Cl.⁵ ............................................. A47H 1/144
[52] U.S. Cl. ............................. 16/114 R; 248/222.1; 248/251; 256/59; 16/111 R
[58] Field of Search .......... 16/111 R, 114 R, DIG. 5, 16/DIG. 24, DIG. 41; 15/145; 74/543; 403/316, 315, 319, 324, 381; 256/59, 65, 67; 248/251, 222.1

[56] References Cited

U.S. PATENT DOCUMENTS

| | | | |
|---|---|---|---|
| 1,249,955 | 12/1917 | Hendrickson et al. | 16/DIG. 24 |
| 1,356,675 | 10/1920 | Weir | 248/251 |
| 1,939,501 | 12/1933 | Kane | 66/126 |
| 2,059,858 | 11/1936 | Ernst | 16/114 R |
| 2,417,620 | 3/1947 | Soderberg | 16/111 R |
| 2,870,493 | 1/1959 | Beyrle | 16/DIG. 5 |
| 3,182,963 | 5/1965 | Thom | 256/65 |
| 3,544,072 | 12/1970 | Thom | 256/65 |
| 4,404,709 | 9/1983 | Janz et al. | 16/DIG. 24 |
| 4,886,297 | 8/1962 | Levine | 280/809 |

Primary Examiner—Robert L. Spruill
Assistant Examiner—Donald M. Gurley
Attorney, Agent, or Firm—Gene E. Shook; James A. Mackin; Guy M. Miller

[57] ABSTRACT

A hand hold utilizes joining mechanisms which comprises two different mounting brackets that are permanently fastened to a supporting structure. A slide plate is disposed at one end of the hand rail or hand hold which mates with one of the mounting brackets. A securing member is disposed at the opposite end of the hand rail/hand hold which connects with the other mounting bracket by means of a locking device. The slide plate has a central tapered tongue with two matching slots disposed on each side thereof.

8 Claims, 5 Drawing Sheets

REMOVABLE HAND HOLD

ORIGIN OF THE INVENTION

The invention described herein was made by employees of the U.S. Government and may be manufactured and used by or for the Government for governmental purposes without the payment of any royalties thereon or therefor.

TECHNICAL FIELD

This invention is concerned with an improved removable hand hold or hand rail. The invention is particularly directed to a removable hand rail/hand hold for extra-vehicular activity (EVA) in space.

Hand rail/hand holds are conventionally permanently attached to a structure and are not easily removed. Removable hand rail/hand holds have been proposed, but these structures require a receptacle and complicated latching mechanisms that are internal to the structure.

Permanently attached hand rails/hand holds for extra-vehicular activity structures required dedicated volumes which impacted packaging. Also, permanently mounted hand rails/hand holds added total weight to the structure and a separate hand rail/hand hold is needed in every hand rail/hand hold location.

Conventional removable hand rail/hand hold structures require a socket to be plugged into a receptacle which is located internal to the structure. Such a device requires complicated locking mechanisms.

It is, therefore, an object of the present invention to provide a removable hand rail/hand hold having a simple guide mechanism that attaches to mounting brackets on a support structure.

Another object of the invention is to provide an improved integral alignment/capture mounting mechanism for a hand rail/hand hold which utilizes an improved locking means to retrain the hand rail/hand hold in its proper position.

BACKGROUND ART

Kane U.S. Pat. No. 1,939,501 is directed to a thread guide for knitting machines. The disclosed structure utilizes a carrier plate with a central tongue having matching slots on each side. The tongue and slots cooperate with two spaced screws in a guide arm to form a connection between the carrier plate and the guide arm.

Levine U.S. Pat. No. 4,886,297 discloses a skateboard having a removably attached handle. The device utilizes connecting means comprising a base plate that is originally connected to a standard skateboard truck bolt pattern, an inverted U-shaped bracket for receiving a tongue member at the rear of a handle lower plate, and a pair of aligned equally spaced apart female sleeve members that accommodate a connecting sleeve in coaxial alignment at the front of the handle lower plate. After the tongue member of the handle lower plate is engaged with the inverted U-shaped bracket, the connecting pin or retaining pin means is disposed through the aligned sleeves to secure the handle in place.

DISCLOSURE OF THE INVENTION

The hand hold of the present invention utilizes joining means which comprises two different mounting brackets that are permanently fastened to the supporting structure. An alignment/capture bracket is disposed at one end of the hand rail or hand hold which mates with one of the mounting brackets. A securing bracket is disposed at the opposite end of the hand rail/hand hold which connects with the other mounting bracket by means of a locking device. The alignment/capture bracket has a central tapered tongue with two matching slots disposed on each side thereof.

The tapered feature of the central tongue serves to laterally guide the bracket into mating position with the mounting bracket, and the matching slots located on each side of the tongue insure proper registration and alignment. Further, the mounting bracket for the alignment/capture bracket has a securing/guide bar with a sloping front lip that serves to vertically guide the alignment capture bracket into mating position.

The hand rail/hand hold is attached to the support structure by first mating the alignment/capture bracket to its receptive mounting bracket and then aligning a set of apertures in the securing bracket so that they communicate with a corresponding passage in the second mounting bracket. With the apertures and passage properly aligned, a pin is inserted through a single hole defined by the apertures and passage and thereby secures the hand rail/hand hold to the support structure. Hand rail/hand hold removal is easily executed by the reverse procedure.

DESCRIPTION OF THE DRAWINGS

The objects, advantages and novel features of the invention will be more fully apparent from the following detailed description when read in connection with the accompanying drawings wherein like numerals are used throughout to identify like parts.

BEST MODE FOR CARRYING OUT THE INVENTION

Figure 1:
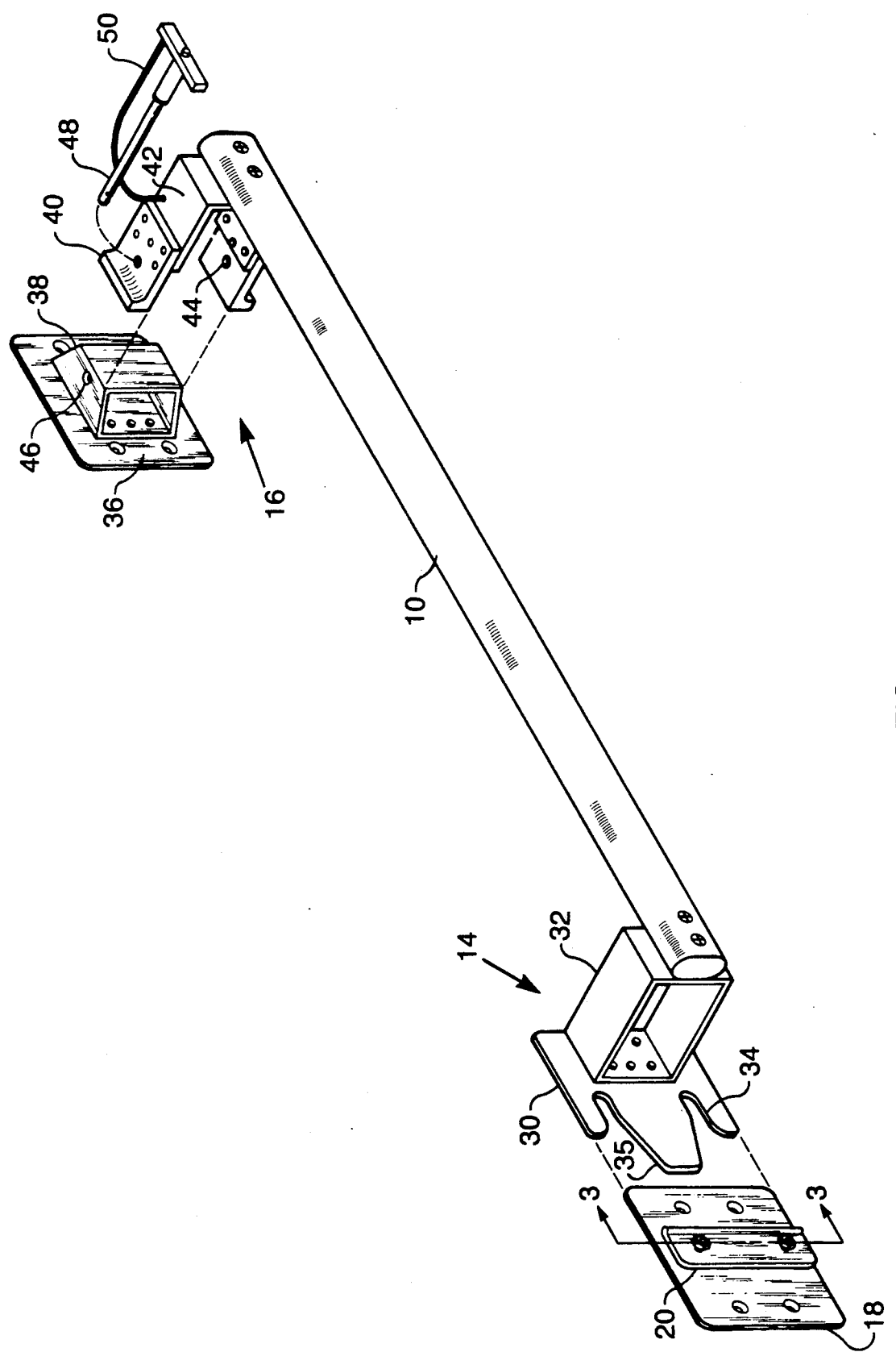
FIG. 1 is a perspective view of a hand hold assembly constructed in accordance with the present invention.
Figure 4:
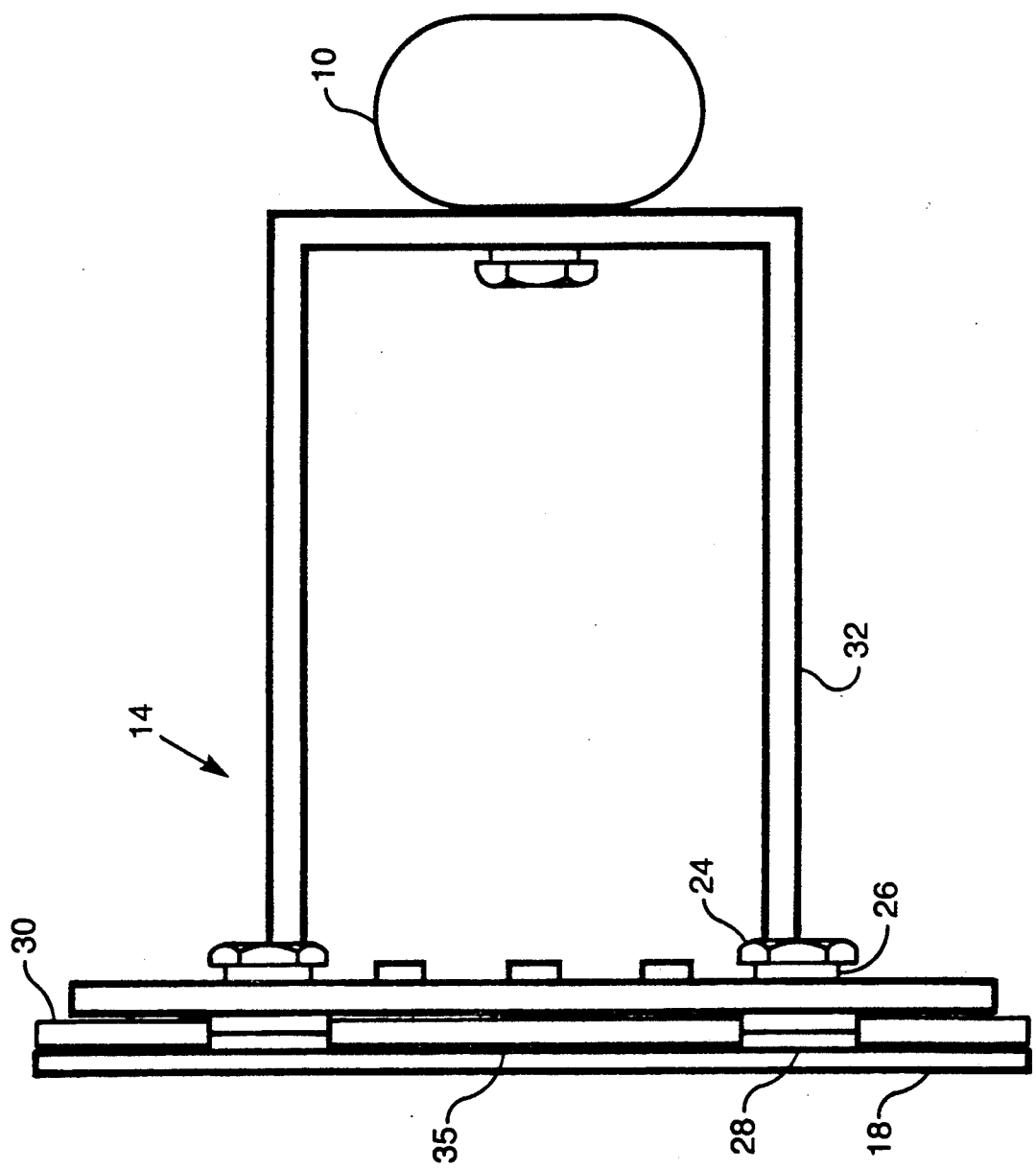
FIG. 4 is an elevation view showing the hand hold assembled to its locking bracket.
Figure 5:
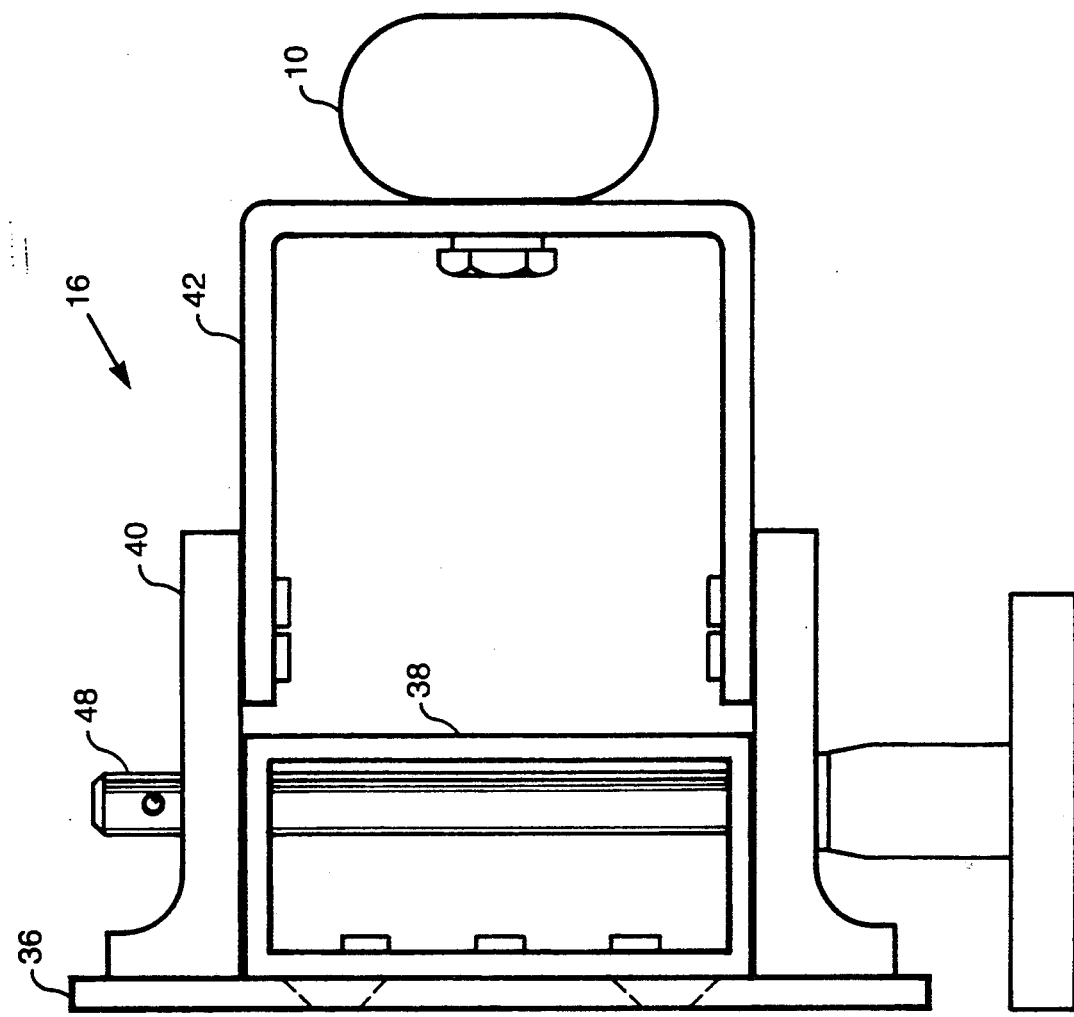
FIG. 5 is an elevation view of the opposite end of the assembly from that shown in FIG. 4.

Referring now to the drawings there is shown in FIG. 1 a removable hand rail/hand hold assembly constructed in accordance with the present invention. This assembly utilizes an elongated substantially rigid handle 10 that is shown in FIGS. 1, 4 and 5. In the preferred embodiment this handle 10 is selectively mounted on a surface 12 of a support structure in space for extra-vehicular activity (EVA) as shown in FIG. 3.

The handle 10 is positioned in a predetermined location on the surface 12 by a locating structure 14 mounted on one end of the handle as shown in FIGS. 1 and 4. A locking structure 16 located at the opposite end of the handle 10 maintains the handle 10 in the predetermined position determined by the locating structure 14.

Figure 2:
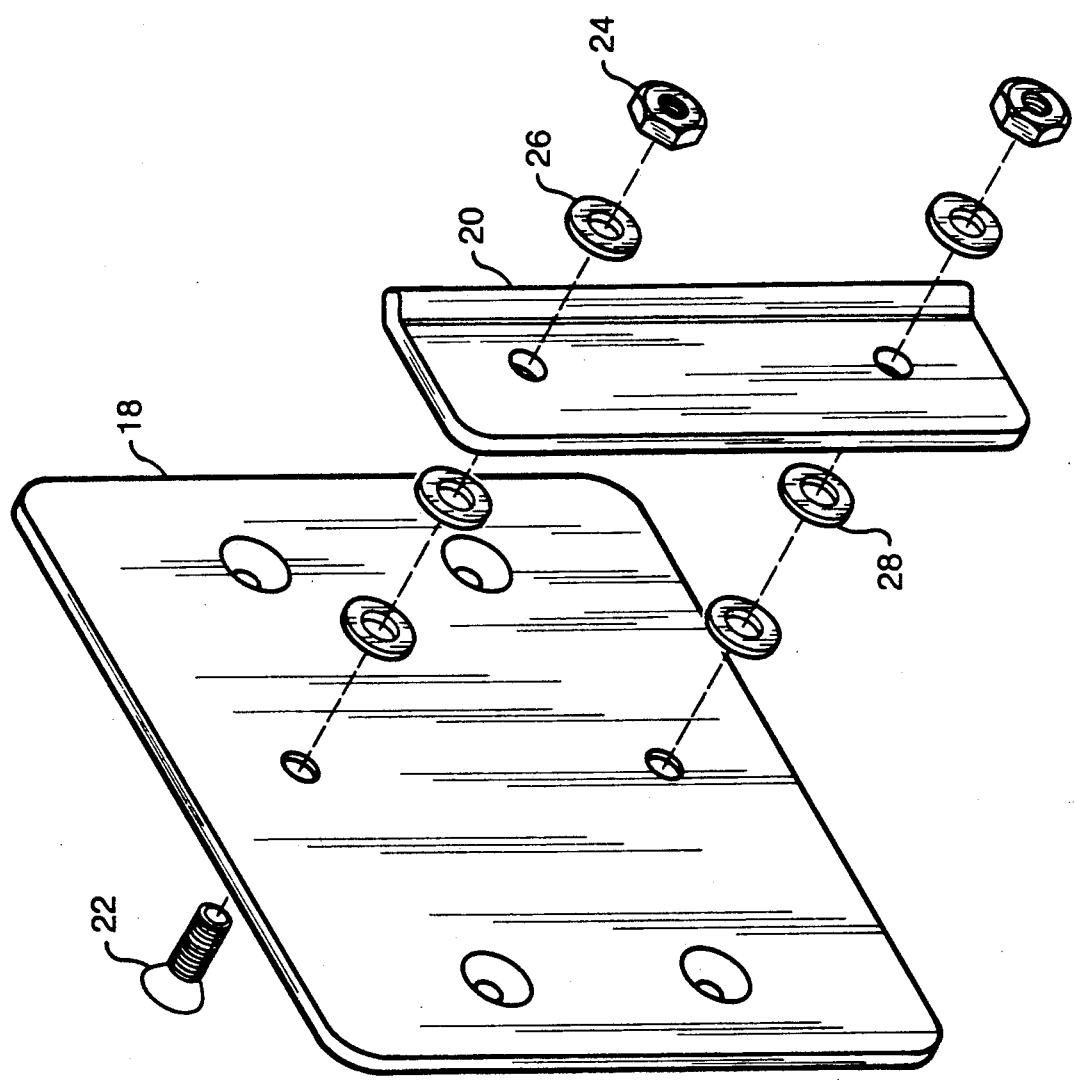
FIG. 2 is an exploded view of a portion of the hand hold assembly shown in FIG. 1.
Figure 3:
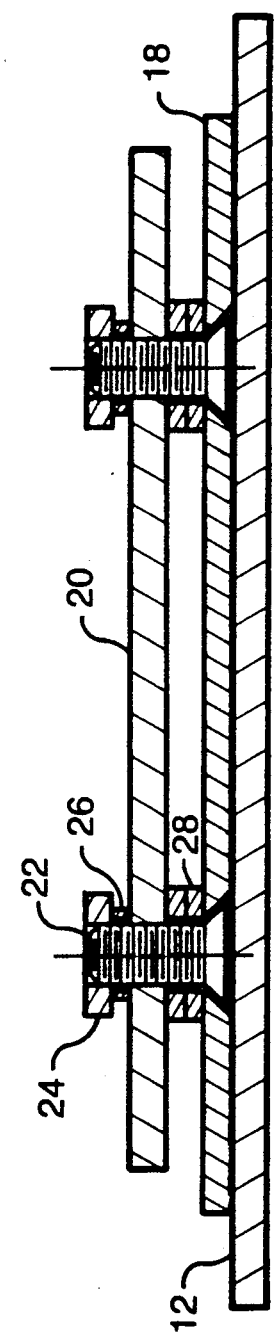
FIG. 3 is a section view taken along the line 3—3 in FIG. 1.

The locating structure 14 includes a mounting bracket having a guide plate 18 that is secured to the surface 12 as shown in FIG. 3. This bracket has a trapping bar 20 with a sloping lip spaced from the guide plate 18. Screws 22 pass through suitable openings in the guide plate and trapping bar as shown in FIG. 2. The trapping bar 20 is rigidly maintained in its position relative to the guide plate by nuts 24 and lock washers 26 as shown in FIGS. 2 and 3. Washers 28 on the screws 22 maintain the trapping bar in spaced relationship with the guide plate 18 at a predetermined distance established by the thickness of the washers 28.

The locating assembly further includes a slide plate 30 that is mounted on the handle 10 by a standoff section 32 shown in FIGS. 1 and 4. The standoff section 32 has a substantially rectangular configuration with one end secured to an end of the handle 10. The opposite end of the standoff section 32 is secured to the slide plate 30 by suitable screws or the like.

Referring to FIGS. 1 and 4 the handle 10 is positioned relative to the guideplate 18 which is mounted on the surface 12 by moving the slideplate 30 along the surface of the guideplate 18. The sloping lip on the plate 20 guides the slide plate vertically. The slideplate 30 has a pair of spaced slots 34 on opposite sides of a central tongue 35 as best shown in FIG. 1. When it is desired to mount the hand rail assembly onto the body 12 the central tongue 35 of the slideplate 30 is inserted between the guideplate 18 and the trapping member 20. The washers 28 on the screws 22 mate with the slots 34 to properly locate the slideplate as shown in FIG. 4. The slideplate 30 is guided laterally by the tapered sides of the tongue 35.

The slideplate 30 is locked into the mating relationship with the guideplate 18 and trapping member 20 by the locking structure 16 at the opposite end of the handle. Referring to FIGS. 1 and 5 this locking structure includes a second bracket including a guideplate 36 that is similar to the guideplate 18 and is mounted on the surface 12 of the body at a predetermined distance from the guideplate 18. A boss 38 is secured to the guideplate 36 by any suitable means such as machine screws.

Securing members in the form of a pair of spaced feet 40 having a generally L-shaped configuration are mounted on the opposite legs of a U-shaped standoff section 42 that is mounted on the opposite end of the handle 10 from the rectangular standoff section 32. Suitably aligned apertures 44 in the feet 40 are provided for alignment with a mating passage 46 in the boss 38. The apertures 44 are aligned with the passage 46 when the slideplate 30 is properly mated with the guideplate 18 as previously described.

A suitable pin 48 is provided for insertion through the hole formed by the aligned apertures 44 and passage 46 to lock the hand hold/hand rail assembly in the predetermined position relative to the surface 12 of the support structure. A flexible tether 50 has one end secured to the pin 48 and the other end secured to the standoff section 42 as shown in FIG. 1. Thus, the pin 48 is readily available for locking the assembly.

It will be apparent from FIG. 1 that both standoff sections 32 and 42 position the handle 10 a predetermined distance from the surface 12 to which the hand hold/hand rail is attached. The rectangular standoff section 32 has the additional function of mounting the slideplate 30 while the U-shaped standoff section 42 mounts the feet 40 which receive the pin 48.

It is evident that only spaced mounting brackets need be supplied on each support structure. When it is desired to have any activity with the support structure the assembly shown in FIG. 1 is positioned parallel to the surface 12 with the standoff sections 32 and 42 facing toward the structure surface. The slideplate 30 is moved along the surface of the guideplate 18 through the opening between the guideplate 18 and the trapping bar 20.

The central tongue 35 of the slideplate 30 as well as the slots 34 provide for alignment and capture of the slideplate 30 by the trapping bar 20. When the slideplate 30 is properly positioned in the bracket formed by the assembly of the guideplate 18 and trapping bar 20, the standoff section 42 will be automatically aligned with the boss 38 on the guideplate 36 which forms the other bracket assembly. The insertion of the pin 48 through the apertures 44 and passage 46 secures the hand hold/hand rail assembly in place.

Removal of the hand hold/hand rail assembly is reversed by first removing the pin 48. The slideplate 30 is moved away from the bracket assembly formed by the guideplate 18 in the trapping bar 20.

While the preferred embodiment of the hand hold/hand rail assembly has been disclosed and described, it will be appreciated that various modifications can be made to this structure without departing from the spirit of the invention or the scope of the subjoined claims. By way of example, the pin 48 is preferably of the quick release type. However, it is contemplated that other structures, such as tapered pins and tapered tubes, may be utilized in accomplishing the guiding and capturing procedure.

We claim:

1. A removable hand hold assembly selectively attached to a support structure in space for extra-vehicular activity (EVA) comprising an elongated substantially rigid handle member having oppositely disposed ends, a pair of spaced standoff sections secured to said ends of said handle member for positioning said handle member a predetermined distance from said support structure, locating means for positioning said handle member relative to said support structure, said locating means comprising a first mounting bracket secured to said support structure, and a slide member mounted on one of said standoff sections for mating with said first mounting bracket for locating said handle and capturing the same in a predetermined position relative to said support structure, and locking means for maintaining said handle in said predetermined position, said locking means comprising a second mounting bracket spaced from said first mounting bracket and secured to said support structure, said second mounting bracket having opposed sides with a passage extending therebetween, a pair of spaced feet mounted on the other standoff section for engaging said opposed sides of said second mounting bracket when said slide member is mated with said first mounting bracket, each of said feet having an aperture therein, and an elongated member for selectively locking said spaced feet to said second mounting bracket by passing through said apertures in said feet and said passage in said second mounting bracket when said slide member is mated with said first mounting bracket.

2. A removable hand hold assembly as claimed in claim 1 wherein the other standoff section has a substantially "U" shaped configuration.

3. A removable hand hold assembly as claimed in claim 1 wherein the passage in the second mounting bracket extends generally parallel to said first mounting bracket, and the elongated member comprises a pin adapted to be inserted through both the apertures in the securing member and the passage in said second mounting bracket when said apertures and said passage are in substantial alignment.

4. A removable hand hold assembly selectively attached to a support structure comprising an elongated substantially rigid handle member having oppositely disposed ends, a pair of spaced standoff sections secured to said ends of said handle member for positioning said handle member a predetermined distance from said support structure, locating means for positioning said handle member relative to said support structure, said locating means comprising a first mounting bracket comprising
a guide member secured to said support structure,
a trapping member, and
means for mounting said trapping member on said guide member in spaced relationship therewith, and a slide member mounted on one of said standoff sections for insertion between said guide member and said trapping member for locating said handle and capturing the same in a predetermined position relative to said support structure, locking means for maintaining said handle in said predetermined position, said locking means comprising a second mounting bracket comprising
a base plate spaced from said guide member and secured to said support structure,
a boss extending outward from said base plate, and
a pair of securing members mounted on the other standoff section for engaging said boss on said base plate when said slide member is inserted between said guide member and said trapping member, and an elongated member for selectively engaging both said boss and said securing members when said securing members engage said boss.

5. A removable hand hold assembly as claimed in claim 4 wherein the other standoff section has a substantially U shaped configuration and the securing members are mounted on the legs of the U.

6. A removable hand hold assembly as claimed in claim 5 wherein each securing member on the other standoff section has an aperture therein, and each securing member engages one side of the boss on the base plate.

7. A removable hand hold assembly as claimed in claim 6 wherein the boss has a passage extending generally parallel to the first mounting bracket, and said elongated member comprises a pin adapted to be inserted through the apertures in the securing members into said boss when said apertures and said passage are in substantial alignment.

8. A hand hold assembly comprising a handle member a pair of spaced standoff sections secured to said handle member for positioning said handle member a predetermined distance from a surface, a slide member mounted on one of said standoff sections, said one standoff section having a substantially rectangular configuration thereby providing rigidity to said slide member, at least one securing member having at least one aperture therein mounted on the other standoff section, a first mounting bracket for mating with and capturing said slide member when said handle is at said predetermined distance from said surface, said first mounting bracket comprising a guide member for engaging a surface of said slide member, a trapping member for engaging another surface of said slide member, said trapping member having a sloping lip to vertically guide said slide member into engagement with said guide member, and a pair of spacing members for maintaining said trapping member in spaced relationship with said guide member thereby providing a mating slot for receiving said slide member, and means for facilitating the mating and capture of said slide member by said guide member and said trapping member comprising a centrally disposed tongue on said slide member for insertion into said mating slot, said tongue having tapered sides to laterally guide the same between said spacing members, and a pair of spaced slots on opposite sides of said tongue for guiding the same into registry with said spacing member, and a second mounting bracket for engaging said securing member, said second mounting bracket having at least one passage in substantial alignment with said apertures in said securing members where said slide member is mated and sutured by said first mounting bracket, and a pin adapted to be inserted in said aligned passage and apertures for locking said handle member to said second mounting bracket when said slide member is mated with said first mounting bracket.

* * * * *